Patented Mar. 1, 1938

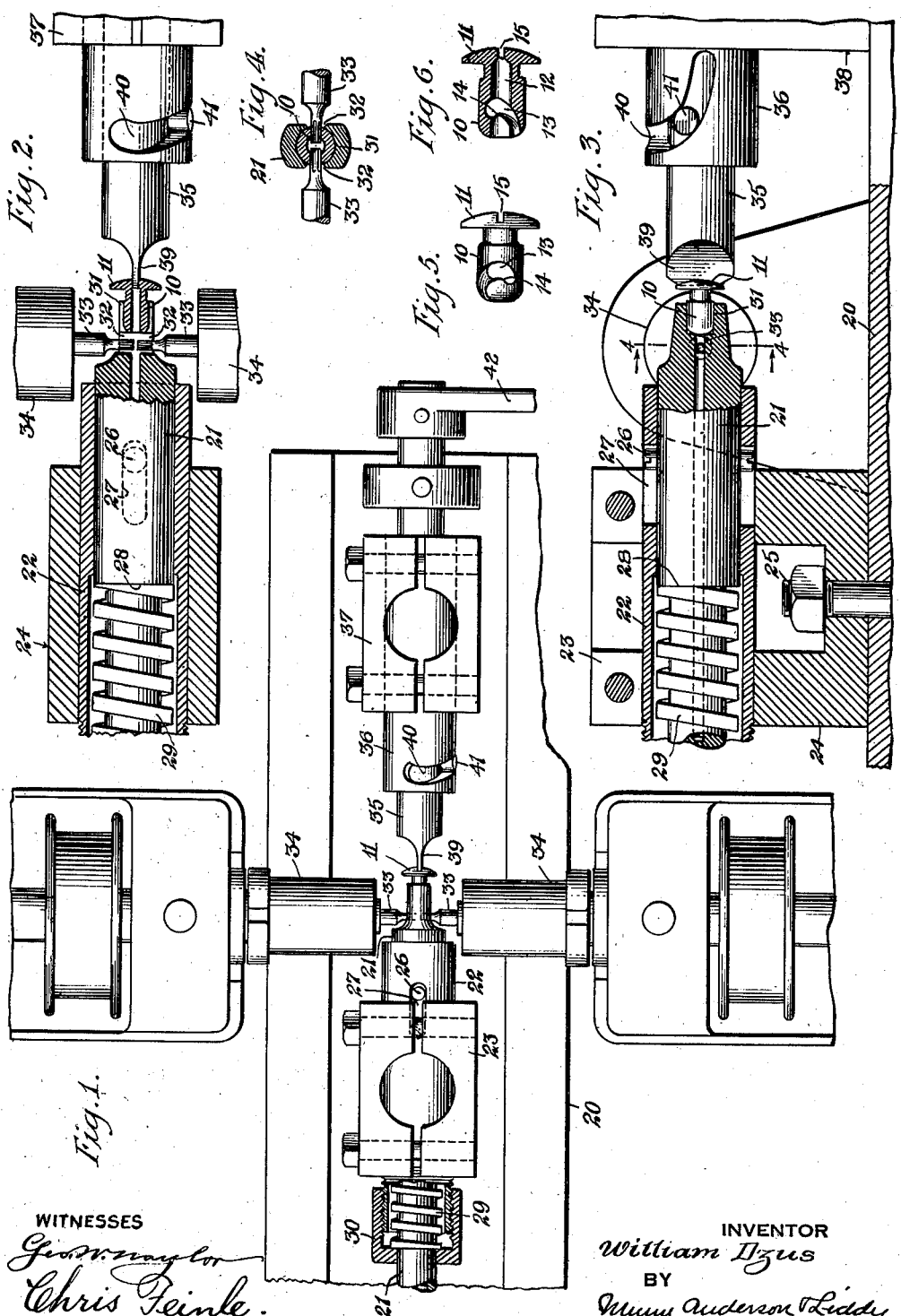

2,109,969

UNITED STATES PATENT OFFICE 2,109,969

MILLING MECHANISM

William Dzus, West Islip, N. Y.

Application January 17, 1936, Serial No. 59,514

6 Claims. (Cl. 90—13.9)

This invention relates to a milling machine, and relates more particularly to mechanism in a machine of the character mentioned, for producing slotted and grooved work.

The invention is useful for producing such work for instance as the fastener elements shown and described in United States Letters Patent No. 1,955,740 and No. 1,986,329, granted to me.

The principal object of the invention is the provision of a mechanism of the indicated character, whereby work, such as the fastener elements, may be completed economically in large quantities.

The nature of the invention and its distinguishing features and advantages will appear when the following specification is read in connection with the accompanying drawing, in which—

Figure 1 is a fragmentary plan view of a milling machine embodying the features of the invention;

Fig. 2 is an enlarged fragmentary sectional plan showing certain features;

Fig. 3 is an enlarged fragmentary vertical longitudinal section of the features shown in Fig. 2;

Fig. 4 is a section taken on the line 4—4 of Fig. 3;

Fig. 5 is a side view of a fastener element slotted by the mechanism of the present invention;

Fig. 6 is a longitudinal section of the fastener element shown in Fig. 5.

Referring now more particularly to Figs. 5 and 6 of the drawing, it will be apparent that there is shown a piece of work in the form of a fastener element, consisting of a shank 10 having a head 11 at one end. The shank 10 has a bore 12 therein extending longitudinally thereof, and said bore opens through the end of the shank opposite the end having the head 11. The shank 10 is therefore of tubular construction, and has bayonet slots 13 opposite each other. One wall of each slot 13 has a projection or hump 14. The head 11 has a kerf 15 therein for the purpose of turning the fastener element. The slots are designed and arranged to receive a cooperative fastener element. The projections 14 serve for the purpose of resisting retrograde rotation to thus prevent unintentional separation of the fastener element herein described when engaged with the cooperative fastener element.

The uses and advantages of the fastener element are fully described in the Patent No. 1,955,740. In the other patent, No. 1,986,329, grooves are provided in the shank of the fastener element in lieu of slots, and said grooves have the same characteristics as the slots.

The milling mechanism of the present invention may be used advantageously for slotting or grooving fastener elements hereinabove described. The mechanism includes a base 20 on which is mounted a work holder or chuck 21 for axial movement in opposite directions and which is prevented from rotating. The chuck 21 fits in a sleeve 22, which is held against movement by a clamp 23 embodied by a block 24 fixed to the base 20 by a bolt and nut 25. The chuck 21 carries a guide pin 26 which extends in a longitudinal slot 27 in the sleeve 22. The chuck 21, therefore, has limited axial movement in opposite directions and is prevented from turning by reason of the pin 26 and slot 27. The chuck 21 is reduced in diameter for a portion of its length and thus provides a shoulder 28. A coil spring 29 is arranged within the sleeve 22 and surrounds the reduced portion of the chuck. One end of the spring 29 bears against the shoulder 28 and its opposite end bears on a tension adjusting nut 30 in threaded engagement with the sleeve 22. The chuck 21 is designed and adapted to solely support the work, and to this end the chuck has a coaxial cavity 31 at its work-receiving end. Said end of the chuck has side openings 32 therein diametrically opposite each other which communicate with the cavity 31. The cavity 31 is so formed as to receive the work or the shank of a fastener element, as shown in Figs. 5 and 6, with the head end projecting therefrom. The openings 32 are positioned to receive rotary material-removing cutters 33 respectively. The cutters 33 are in axial alinement with respect to each other, and are disposed at a right angle with respect to the longitudinal axis of the chuck 22. Each cutter 33 is driven or rotated by suitable driving means 34. It will be observed that the inner ends of the openings 32 occur behind the cavity 31, so that the cutters 33 may operate to remove material from the work as the chuck 21 is moved inwardly with respect to the sleeve 22, and while the work is being turned with respect to the chuck.

The work is turned with respect to the chuck 21 and said chuck is caused to move axially inward with respect to the sleeve by means of a turning bar 35. The bar 35 fits in a cam sleeve 36, which is held against movement by a clamp 37 embodied by a block 38 fixed to the base 20 similarly to the manner in which the block 24 is fixed thereto. The bar 35 is in axial alinement with the chuck 21, and has a work-receiving end 39 similar to the end of a screw-driver, for engagement in the kerf 15 in the head 11 of the fastener element when positioned in the cavity 31.

The sleeve 36 has a slot 40 which receives a pin 41 carried by the bar 35. The slot 40 is spiral with respect to the axis on which the bar 35 turns, and the walls of the slot 40 cooperate with the pin 41 to cause the bar to move axially toward the chuck a predetermined distance and also to permit it to move axially in the opposite direction a predetermined distance as the bar 35 is turned one-quarter of a revolution. The bar 35 has a handle 42 for this purpose.

The mechanism is used as follows: A fastener element is positioned in the cavity 31 in the chuck 21, and the end 39 of the bar 35 is entered in the kerf 15 in the head 11 of the fastener element. The pin 41 will be disposed at the starting end of the slot 40, as shown in Figs. 1, 2 and 3. The cutters 33 will be rotating by reason of the driving means 34. The handle 42 will be manipulated by the operator to turn the bar 35 clockwise. By reason of the coaction of the pin 41 with the walls of the slot 40, the bar 35 will be caused to move axially toward the chuck 21, with the result that the fastener element will be caused to rotate clockwise with respect to the chuck 21 and the chuck will be caused to move axially in the same direction as the bar 35 against the action of the spring 29. By reason of the pattern of the slot 40, the chuck 21 will be caused to move axially in a reverse direction or outwardly with respect to the sleeve 22 after it has moved axially inward with respect thereto a predetermined distance and while the bar 35 and the fastener element are being turned one-quarter of a revolution. The reverse axial movement of the chuck 21 is caused by the reaction of the spring 29. The fastener element will, therefore, be caused to turn one-quarter of a revolution and will also be caused to move axially in one direction a predetermined distance and axially in a reverse direction a predetermined distance with respect to the cutters 33 by reason of the pattern of the slot 40, and as a consequence the cutters 33 will remove material from the shank 10 of the fastener element and form the spiral slots 13 with the projections 14 at the inner ends of said slots, as illustrated in Figs. 5 and 6. By pulling on the handle 42, the bar 35 may be moved sufficiently to enable the disengagement of the bar 35 from the fastener element. The fastener element with the slots cut therein may be readily removed from the chuck which will then be ready to receive another fastener element for the slot-cutting operation.

It will be obvious that the mechanism is designed and adapted for quickly and easily producing the slots in the work, thereby making it possible to complete large quantities of slotted fasteners, for instance, in an economical manner. It is to be understood that by the use of suitable cutters with cutting edges on the opposing ends as well as on the sides thereof, grooves may be provided in the shank of each fastener element in lieu of the slots 13, thus making it possible to complete fastener elements of the kind disclosed in the Patent No. 1,986,329.

I claim:

1. In a milling machine, a support having a coaxial cavity therein opening through one end thereof, and also having a side opening therein communicating with said cavity, said cavity serving for the purpose of receiving therein the work to be supported by said support with one end projecting therefrom, said support being non-rotatable and axially movable, a fixed rotary cutter extending transversely with respect to said support and projecting through the side opening therein for the purpose of removing material from the work, and means engageable with the work for the purpose of turning the work and also moving the work and support axially in one direction a predetermined distance.

2. In a milling machine, a chuck having a coaxial cavity therein opening through one end thereof, and also having a side opening therein communicating with said cavity, said cavity serving for the purpose of receiving therein the work to be supported by said chuck with one end projecting therefrom, said chuck being non-rotatable and axially movable, a rotary cutter extending transversely with respect to said chuck and projecting through the side opening therein for the purpose of removing material from the work, means engageable with the work for the purpose of turning the work and simultaneously moving the same axially while at the same time moving the chuck axially in one direction a predetermined distance, said means also being movable reversely to the first mentioned direction, and means to cause the chuck and work to move axially in a reverse direction upon the aforesaid reverse movement of said first means.

3. In a milling machine, a non-rotatable axially movable chuck which supports the work, means to turn the work with respect to the chuck, said means on each actuation making a part of a revolution and also a limited forward axial movement, the axial movement of said means moving said work and said chuck axially, said means being reversible, a cutter projecting into an opening in the chuck for removing material from the work as the latter is caused to move with and with respect to the chuck, and resilient means acting on said chuck to move it and the work in a reverse direction when said means have been reversed.

4. In a milling machine, a chuck, a stationary sleeve surrounding the chuck, coacting means on the chuck and sleeve whereby the chuck is movable axially in opposite directions but is prevented from turning with respect to the sleeve, resilient means engaging the chuck and sleeve to constantly urge the chuck axially in one direction and yieldable to allow the chuck to move axially in the opposite direction, said chuck having means for holding work coaxial with the axis thereof and thus enabling the work to move axially with the chuck and to turn with respect thereto, and reversible means engageable with the work to cause the axial movement of the chuck and work in one direction and the turning movement of the work with respect to the chuck simultaneously, and allowing axial movement of the chuck and work in the opposite direction by said resilient means.

5. In a milling machine, a chuck, a stationary sleeve surrounding the chuck, coacting means on the chuck and sleeve whereby the chuck is movable axially in opposite directions, but is prevented from turning with respect to the sleeve, resilient means engaging the chuck and sleeve to constantly urge the chuck axially in one direction and yieldable to allow the chuck to move axially in the opposite direction, said chuck having means for holding work coaxial with the axis thereof, and thus enabling the work to move axially with the chuck and to turn with respect thereto, means engageable with the work to cause the axial movement of the chuck and work in one direction and the turning movement of the work with respect to the chuck simultaneously, and allowing axial movement of the chuck and work in the opposite direction by said resilient means, and material removing cutters extending transversely with respect to the axial path of movement of the work.

6. In a milling machine, a work engaging bar having turning and axial movement in opposite directions, a chuck in axial alinement with said bar, said chuck having means for turnably holding work coaxially with the axis thereof, said chuck being mounted for axial movement in opposite directions, means to prevent turning of the chuck, resilient means acting on the chuck to constantly urge it axially in one direction and allowing it to move axially in the opposite direction, and cutters arranged on opposite sides respectively of the axis of the chuck in axial alinement with respect to each other and disposed radially with respect to said axis, said chuck having side openings therein in which the cutters project respectively, so as to remove material from the work, when said bar, engaged with the work, is turned in one direction and moved axially in opposite directions, while the work is held by the chuck as aforesaid.

WILLIAM DZUS.